United States Patent [19]

Weaver et al.

[11] Patent Number: 4,892,922

[45] Date of Patent: Jan. 9, 1990

[54] POLYESTER POLYMER CONTAINING THE RESIDUE OF A BENZOPYRAN COLORANT COMPOUND AND SHAPED ARTICLES PRODUCED THEREFROM

[75] Inventors: Max A. Weaver; Clarence A. Coates, Jr.; Wayne P. Pruett, all of Kingsport; Samuel D. Hilbert, Jonesborough, all of Tenn.

[73] Assignee: Eastman Kodak Company, Rochester, N.Y.

[21] Appl. No.: 287,814

[22] Filed: Dec. 21, 1988

Related U.S. Application Data

[63] Continuation-in-part of Ser. No. 126,315, Nov. 30, 1987, abandoned.

[51] Int. Cl.$^4$ .............. C08G 63/20; C08G 63/18; C08G 63/16
[52] U.S. Cl. .................... 528/190; 525/411; 528/288; 528/289; 528/290; 528/291; 528/298
[58] Field of Search ............. 525/411; 528/288, 289, 528/290, 291, 298, 305, 190; 549/277, 280, 288, 291; 548/223, 159

[56] References Cited

U.S. PATENT DOCUMENTS

| | | | |
|---|---|---|---|
| 2,680,747 | 6/1954 | Williams et al. | 549/280 |
| 2,844,594 | 7/1958 | Long et al. | 549/288 |
| 2,929,822 | 3/1960 | Hausermann | 549/288 |
| 3,148,163 | 9/1964 | Freyermuth | 524/110 |
| 3,285,993 | 11/1966 | Inamoto et al. | 528/305 |
| 3,533,730 | 10/1970 | Voltz et al. | 8/927 |
| 3,704,302 | 11/1972 | Enomoto et al. | 544/249 |
| 3,801,602 | 4/1974 | Scheuermann et al. | 549/404 |
| 3,873,940 | 3/1975 | Drexhage | 549/280 |
| 3,910,912 | 10/1975 | Scheuermann et al. | 544/284 |
| 3,933,847 | 1/1976 | Ohkawa et al. | 548/330 |
| 3,985,763 | 10/1976 | Harnisch | 548/223 |
| 4,055,568 | 10/1977 | Patsch et al. | 548/136 |
| 4,105,665 | 8/1978 | Harnisch | 524/110 |
| 4,347,350 | 8/1982 | Horner | 528/193 |
| 4,794,079 | 12/1988 | Buckler et al. | 549/288 |

FOREIGN PATENT DOCUMENTS

224592A1 7/1985 Fed. Rep. of Germany .
56-151751 11/1981 Japan .

*Primary Examiner*—Veronica P. Hoke
*Attorney, Agent, or Firm*—J. Frederick Thomsen; William P. Heath, Jr.

[57] ABSTRACT

Colored polyester compositions useful for molding into articles such as food containers, beverage bottles, cured structural plastics and the like comprising molding grade polyester such as a linear, thermoplastic polyester having reacted therewith or copolymerized therein the residue of a 7-amino-2H-1-benzopyran-2-one compound or a 7-amino-2H-1-benzopyran-2-imine compound, said residue absorbing radiation in the range of about 400 to 450 nm and being non-extractable from said polymer and stable under polymer formation and processing conditions.

12 Claims, No Drawings

POLYESTER POLYMER CONTAINING THE RESIDUE OF A BENZOPYRAN COLORANT COMPOUND AND SHAPED ARTICLES PRODUCED THEREFROM

This application is a continuation-in-part of our co-pending application Ser. No. 126,315 filed Nov. 30, 1987 now abandoned.

This invention pertains to novel polyester compositions such as linear, thermoplastic polyesters wherein one or more benzopyran moieties have been incorporated in the chain or backbone of the polymer. This invention also pertains to shaped articles, particularly to packaging materials such as containers suitable for packaging beverages and foods, manufactured from our novel polyester compositions.

The use of polyester compositions in the fabrication of packaging materials for comestibles such as beverages, e.g., fruit juices, soft drinks, wines and the like, and prepared foods as well as other products such as cosmetics and shampoos is finding increased acceptance in the packaging industry. Additives, particularly colorants, frequently are incorporated into such polyester materials. However, regulatory agencies have placed strict limitations on the amounts of such additives that can migrate to, or are extracted by, comestibles packaged in containers fabricated from polyester compositions.

We have discovered that bright, fluorescent, yellow polyester compositions can be obtained by reacting or copolymerizing certain benzopyran compounds with polyesters wherein the residue of the benzopyran compound is an integral part of the polyester polymer. The benzopyran compounds defined hereinbelow are thermally stable at the high temperatures, e.g., up to 300° C., at which linear, thermoplastic polyester commonly used in packaging materials are prepared. The compounds possess high extinction coefficients (tinctorial strength) and the residues thereof, being reacted with the polyester chains, are nonextractable from packaging materials produced therefrom. The benzopyran compounds can be used in combination with other colorants to produce polyester compositions having a variety of colors such as green and amber.

The reaction or copolymerization of the benzopyran compounds specified herein has not been suggested heretofore. Furthermore, some of the known benzopyran compounds are not suitable for incorporation into polyester polymer to produce colored polyester compositions, either because the known compounds do not absorb light over the requisite range or because they do not possess the necessary thermal stability. For example, the benzopyran compounds disclosed in U.S. Pat. No. 4,105,665 are not stable under polyester-forming conditions. U.S. Pat. No. 4,347,350 discloses the incorporation of colorless benzopyran compounds into polyester polymer but does not disclose the preparation of colored polyester compositions.

U.S. Pat. No. 4,359,570 discloses polyester compositions comprising a polyester having certain anthraquinone colorants copolymerized therein. Polyester compositions comprising a molding or fiber grade polyester having a broad class of methine colorants reacted or copolymerized therein are disclosed in U.S. Pat. No. 4,617,373. However, neither of these patents disclose the incorporation of benzopyran residues into polyesters to obtain the compositions described herein.

The novel polyester composition provided by our invention comprises molding or fiber grade polyester polymer having copolymerized therein or reacted therewith the residue of certain 7-amino-2H-1-benzopyran-2-one or 7-amino-2H-1-benzopyran-2-imine compounds, said residue absorbing radiation in the range of about 400 to 450 nm and being non-extractable from said polymer and stable under the polymer processing conditions. The benzopyran residues have high extinction coefficients and impart fluorescent colors in the range of yellow to orange to the novel polyester compositions.

The aforesaid residue of the 7-amino-2H-1-benzopyran-2-one compounds or 7-amino-2H-1-benzopyran-2-imine compounds are derived from compounds which bear at least one group or substituent that is reactive with one of the monomers from which the polyester polymer is derived. The reactivity of the benzopyran compound resulting from the presence thereon of one or more reactive substituents also enables the compounds to react with a prepolymer or polymer derived from the monomers. The precursors of the residues having one reactive group react at the terminal of the polymer chain and thus function as chain terminating agents. When the precursor compounds contain two reactive groups, the compounds function as monomers, and thus are copolymerized within the polymer chain.

The amount of the benzopyran residue present in the condensation polymer compositions typically may be in the range of about 10 to 100,000 ppm by weight per million parts by weight polymer. The residue may be derived from one or a plurality of the benzopyran compounds specified hereinbelow.

The benzopyran compounds useful in preparing the novel polyester compositions provided by this invention include colorant compounds have the formula

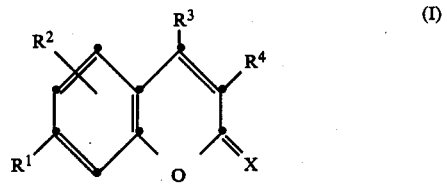

wherein
$R^1$ is amino or

$R^2$ is hydrogen, alkyl, —O—$R^5$, or halogen;
$R^3$ is hydrogen, an aryl radical or an alkyl radical, or

$R^4$ is cyano,

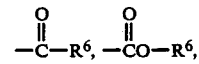

carbamoyl,

—SO$_2$—R$^5$, or a carbocyclic or heterocyclic aryl radical; and
X is oxo or imino; wherein
R$^5$ is alkenyl or an alkyl, cycloalkyl or aryl radical;
R$^6$ is hydrogen or an alkyl, cycloalkyl or aryl radical;
and

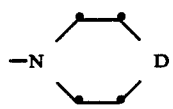

collectively are (1) a group having the structure

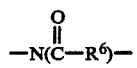

wherein D is —CH$_2$—, —O—, —S—, —SO$_2$—, —N(R$^5$)—,

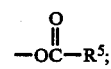

or —N(SO$_2$—R$^6$)—; (2) a divalent group having the structure

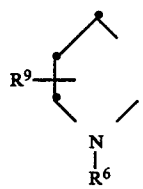

which with the carbon atoms of the benzopyran nucleus forms a fused, six-membered ring; or (3) a trivalent group having the structure

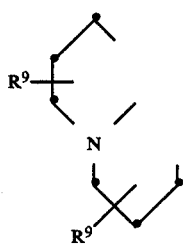

which with the carbon atoms of the benzopyran nucleus forms two fused, six-membered rings; wherein R$^9$ is hydrogen, alkyl, hydroxy, —O—R$^5$,

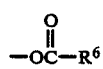

or halogen; provided the benzopyran compound bears at least one substituent that is reactive with one of the monomers from which the condensation polymer is derived, said benzopryan residue absorbing radiation in the range of about 400 to 450 nm and being non-extractable from said polymer and stable under the polymer processing conditions.

The alkyl radicals represented by R$^5$ and R$^6$ can be unsubstituted or substituted alkyl of up to about 12 carbon atoms, preferably up to about 8 carbon atoms. Examples of the unsubstituted alkyl radicals include methyl, ethyl, propyl, butyl, isobutyl, pentyl, hexyl, octyl, 2-ethylhexyl, decyl, dodecyl, and isomers thereof. Examples of the substituents which may be present on the substituted alkyl radicals include hydroxy, alkoxy, hydroxyalkoxy, alkylthio, hydroxyalkylthio, halogen such as chloro or bromo; cyano; carboxylic acyloxy, e.g., groups having the formula

alkylsulfonyl; cycloalkylsulfonyl; arylsulfonyl; vinylsulfonyl; carboxylic acylamido, e.g., groups having the formula

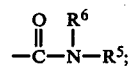

acrylamido; sulfonic acylamido, e.g., groups having the formula —N(R$^6$)SO$_2$—R$^5$; alkoxycarbonyl; cycloalkoxycarbonyl; aryloxycarbonyl; alkoxycarbonylamino; cycloalkoxycarbonylamino; aryloxycarbonylamino; carboxy; carbamoyl; N-substituted carbamoyl, e.g., groups having the formula

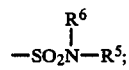

sulfamoyl; N-substituted sulfamoyl, e.g., groups having the formula

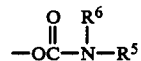

carbamic acid acyloxy, e.g., groups having the formula

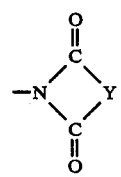

and alkoxycarbonyloxy. The alkyl radicals also may be substituted with aryl, alkoxycarbonylaryl, chlorocarbonylaryl, N-(hydroxyalkyl)carbamoylaryl, N-(hydroxyalkyl)sulfamoylaryl, aryloxy, alkoxycarbonylaryloxy, arylthio, cycloalkyl, cycloalkoxy and cycloalkylthio wherein the aryl and cycloalkyl radicals are defined hereinbelow. Additional examples of the substituents which may be present on the alkyl radicals represented by R$^5$ and R$^6$ are imide groups having the formula wherein Y represents the residue of a dicarboxylic acid such as, for example, ethylene; ethylene substituted with hydroxy, alkoxy, alkanoyloxy or halogen, 1,3-propanediyl, 1,2-cyclohexylene, 1,2-tetrahydrophenylene, 1,2-phenylene, or 1,2-phenylene substituted with carboxyl, alkyl, alkoxy, or halogen. Y also may represent —NH—CH$_2$—, —N(alkyl)—CH$_2$—, —O—CH$_2$—, —S—CH$_2$—, or —CH$_2$—O—CH$_2$—. Alkyl radicals R$^5$ and R$^6$ also may be substituted with 2-pyrrolididono or groups having the structure

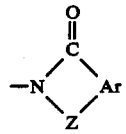

wherein Ar is an o-arylene radical, e.g., unsubstituted or substituted o-phenylene and Z is —CH$_2$— or —SO$_2$—.

The substituents which may be present on the substituted alkyl groups also include heterocyclic thio groups, e.g., groups having the formula —S—Het wherein Het is a heterocyclic aryl radical such as unsubstituted and substituted pyridyl, pyrimidinyl, pyrolyl, quinolyl, thienyl, furanyl, benzoxazolyl, benzimidazolyl, benzothiazolyl, 1,3,4-thiadiazol-2-yl, 1,2,4-thiadiazol-3-yl, or triazolyl.

The cycloalkyl radicals represented by R$^5$ and R$^6$ may be unsubstituted or substituted cycloalkyl having from 5 to 7 nuclear carbon atoms. The aryl radicals represented by R$^5$ and R$^6$ may be unsubstituted or substituted carbocyclic aryl having from 6 to 10 carbon atoms. Examples of the substituents present on the substituted aryl radicals include alkyl and the substituents which can be present on the substituted alkyl radicals represented by R$^5$.

Examples of the various substituents which may be present on the benzopyran compounds, i.e., the substituents represented by R$^1$, R$^2$, R$^3$ and R$^4$ are included in the above definition of R$^5$ and R$^6$. The various alkyl groups and alkyl moiety-containing groups included in the definitions of R$^1$, R$^2$, R$^3$ and R$^4$ can contain up to about 12 carbon atoms, preferably up to about 8 carbon atoms.

The benzopyran compounds defined hereinabove bear at least one group or substituent that is reactive with one of the monomers from which the condensation polymer is derived. The reactivity of the benzopyran compound resulting from the presence thereon of one or more substituents also renders the compounds reactive with a prepolymer or a polymer derived from the monomers. The benzopyran compounds having one reactive group react at the terminus of the polymer chain and thus function as chain terminating agents. When the benzopyran compound contains two reactive groups, the compound will function as a monomer and thus be copolymerized within the polymer chain. Examples of the requisite reactive groups include hydroxy, ester groups such as carboxylic acyloxy, e.g., groups having the formula

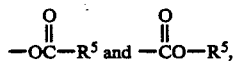

alkoxycarbonyloxy, and carbamic acyloxy, e.g., groups having the formula

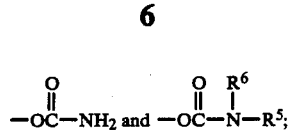

carboxy; and carboxylic acid halides such as carbonyl chloride.

The preferred reactive benzopyran compounds have the formula

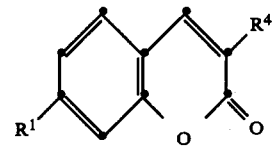

wherein
R$^1$ is N,N-bis(hydroxyalkyl)amino, N-alkyl-N-alkanoyloxyalkylamino, N-aryl-N-alkanoyloxyalkylamino, N-alkyl-N-hydroxyalkylamino, N-aryl-N-hydroxyalkylamino, N,N-bis(alkanoyloxyalkyl)amino, N-alkyl-N-carboxyalkylamino, N,N-bis(carboxylalkyl)amino, N-alkyl-N-alkoxycarbonylalkylamino, N,N-bis(alkoxycarbonylalkyl)amino, N-alkyl-N-alkoxycarbonylbenzylamino, N,N-bis(alkoxycarbonylbenzyl)amino, N-alkyl-N-carboxybenzylamino or N,N-bis(carboxybenzyl)amino; and R$^4$ is alkoxycarbonyl, arylsulfonyl, cyano, 2-benzoxazolyl, carboxy-2-benzoxazolyl, alkoxycarbonyl-2-benzoxazolyl, 2-benzothiazolyl, carboxy-2-benzothiazolyl, alkoxycarbonyl-2-benzothiazolyl, 2-benzimidazolyl, carboxy-2-benzimidazolyl or alkoxycarbonyl-2-benzimidazolyl;

wherein each alkyl group and alkyl moiety contains up to 6 carbon atoms and each aryl group is phenyl or phenyl substituted with alkyl of up to 4 carbon atoms or halogen.

As stated hereinabove, the benzopyran compounds must bear or contain at least one substituent that is reactive with one of the monomers from which the condensation polymer is derived. Examples of such reactive substituents include carbonyl halides such as carbonyl chloride, carboxy, alkoxycarbonyl, alkenyloxycarbonyl, cycloalkoxycarbonyl, aryloxy-carbonyl, amino, hydroxy, esterified hydroxy, i.e., acyloxy, groups such as carboxylic acid esters, e.g., alkanoyloxy, cycloalkanoyloxy and aroyloxy, carbamic acid esters, e.g., N-alkyl-carbamoyloxy and N-arylcarbamoyloxy and carbonate esters, e.g., ethoxycarbonyloxy. The benzopryan residue may be incorporated into or on the polymer chain by reacting one or more benzopyran compounds of formula (I) with the monomers, with a prepolymer or with the final polymer. As those skilled in the art will appreciate, when the reactive substituent or substituents are alkoxycarbonyl, alkenyloxycarbonyl, cycloalkoxycarbonyl, aryloxycarbonyl, or acyloxy, the alkyl, alkenyl, cycloalkyl and aryl residues and the acid residues of the acyloxy substituents are displaced or removed from the benzopyran compound upon reaction with the polymer or polymer precursor. Thus, those residues are not important to the benzopyran residue component of our novel compositions.

The benzopryan compounds of formula (I) can be prepared according to published procedures or variations thereof which are readily apparent to those skilled in the art. For example, the benzopyran compounds may be synthesized from salicylaldehydes (III) by the Perkin Reaction (Johnson, Organic Reactions, John Wiley and Sons, New York, 1942, Vol. 1, p. 210), e.g.:

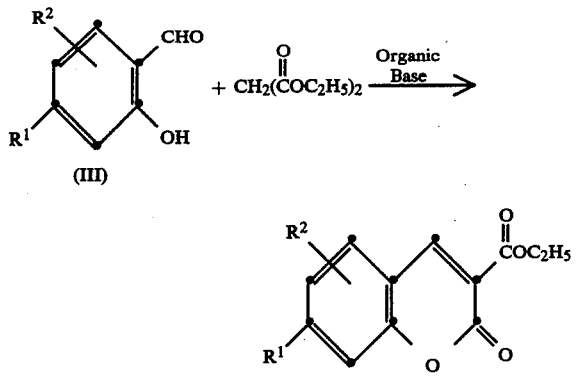

Additional references pertaining to the preparation of coumarins and iminocoumarins include The Chemistry of Coumarins, S. Sethna and N. M. Shan, Chem. Rev., 36, 1; Coumarins, Heterocyclic Compounds, ed. R. C. Elderfield, Vol 2, p. 173; Coumarin and Its Derivatives, Chemistry of Carbon Compounds, C. H. Rodd, Vol IVB, p. 869; and U.S. Pat. Nos. 4,055,568, 4,018,796, 3,933,847, 3,910,912, 3,801,602, 3,704,302 and 3,533,730.

The polyesters which may be used in the preparation of the compositions of our invention include linear, thermoplastic, crystalline or amorphous polyesters produced by conventional polymerization techniques from one or more diols and one or more dicarboxylic acids. The polyesters normally are molding or fiber grade and have an inherent viscosity (I.V.) of about 0.4 to about 1.2. The preferred polyesters comprise at least about 50 mole percent terephthalic acid residues and at least about 50 mole percent ethylene glycol and/or 1,4-cyclohexanedimethanol residues. Particularly preferred polyesters are those containing from about 75 to 100 mole percent terephthalic acid residues and from about 75 to 100 mole percent ethylene glycol residues.

The diol components of the described polyesters may be selected from ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, X,8-bis(hydroxymethyl)-tricyclo-[5.2.1.0]-decane wherein X represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

The acid components (aliphatic, alicyclic, or aromatic dicarboxylic acids) of the linear polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalene-dicarboxylic acid and the like. In the polymer preparation, it is often preferable to use a functional acid derivative thereof such as the dimethyl, diethyl, or dipropyl ester of the dicarboxylic acid. The anhydrides or acid halides of these acids also may be employed where practical.

The linear polyesters may be prepared according to procedures well known in the art. For example, a mixture of one or more dicarboxylic acids, preferably aromatic dicarboxylic acids, or ester forming derivatives thereof, and one or more diols may be heated in the presence of esterification and/or poly-esterification catalysts at temperatures in the range of 150° to 300° C. and pressures of atmospheric to 0.2 mm Hg. Normally, the dicarboxylic acid or derivative thereof is esterified or transesterified with the diol(s) at atmospheric pressure and at a temperature at the lower end of the specified range. Polycondensation then is effected by increasing the temperature and lowering the pressure while excess diol is removed from the mixture.

The novel polyester compositions provided by this invention are useful in the manufacture of containers or packages for comestibles such as beverages and food. By the use of known heat-setting techniques, certain of the polyesters are, in terms of color, I.V. and heat distortion, stable at temperatures up to about 100° C. Such stability characteristics are referred to herein as "hot-fill" stability. Articles molded from these polyesters exhibit good thin-wall rigidity, excellent clarity and good barrier properties with respect to moisture and atmospheric gases, particularly carbon dioxide and oxygen.

The linear polyesters most preferred for use in articles having "hot-fill" stability comprise poly(ethylene terephthalate), poly(ethylene terephthalate) wherein up to 5 mole percent of the ethylene glycol residues have been replaced with residues derived from 1,4-cyclohexanedimethanol and poly(ethylene 2,6-naphthalenedicarboxylate), wherein the polyesters have been sufficiently heat set and oriented by methods well known in the art to give a desired degree of crystallinity. By definition, a polymer is "hot-fill" stable at a prescribed temperature when less than 2% change in volume of a container manufactured therefrom occurs upon filling the same with a liquid at the temperature. For the manufacture of blow-molded beverage bottles, the most preferred polyesters have an I.V. of 0.65 to 0.85, and a Tg of >70° C., and film sections cut from the bottle have a Water Vapor Transmission Rate of 1.5 to 2.5 g mils/100 in.$^2$ −24 hours, a Carbon Dioxide Permeability of 20 to 30 cc. mils/100 in.$^2$ −24 hours -atm., and an Oxygen Permeability of 4 to 8 cc. mils/100 in.$^2$ −24 hours -atm. The Tg is determined by Differential Scanning Calorimetry at a scan rate of 20 Centigrade Degrees/min., the Oxygen Permeability by the standard operating procedure of a MOCON OXTRAN 100 instrument of Modern Controls, Inc., of Elk River, Minnesota, and the Carbon Dioxide Permeability by the standard operating procedure of a MOCON PERMATRAN C II, also of Modern Controls.

The concentration of the residue of the benzopyran compound in the condensation polymer can be varied substantially depending, for example, on the depth of shade or color desired and/or the end use for which the polyester composition is intended. When the colored composition is to be used in the fabrication of relatively thin-walled containers, the concentration of the residue of the benzopyran compound normally will be in the range of about 50 to 1500 ppm (parts by weight per million parts by weight polymer) with the range of about 200 to 800 ppm being especially preferred.

Polyester compositions containing substantially higher amounts, e.g., from about 2.0 to 10.0 weight percent, of the residue of one or more of the benzopyran compounds described herein may be used as polymer concentrates. Such concentrates may be blended with the same or different polymer according to conventional procedures to obtain colored polymer compositions which will contain a predetermined amount of the residue or residues in a nonextractable form. In the preparation of these highly loaded, polymer composition concentrates the residue preferably is divalent and thus is derived from a difunctional benzopyran compound such as the compound of Example 29.

The preparation of the benzopyran compounds and their use in preparing the compositions of our invention are further illustrated by the following examples:

EXAMPLE 1

A mixture of 2-acetoxy-4-[bis(2-acetoxyethyl)amino]-benzaldehyde (3.51 g, 0.01 mol), ethyl α-(2-benzoxazolyl) acetate (2.05 g, 0.01 mol), ethanol (25 mL), piperidine (10 drops), and acetic acid (5 drops) is heated at reflux for 2 hours and allowed to cool. The yellow solid is collected by filtration, washed with ethanol and dried in air to yield 3.0 g (66.6% of theory) of 3-(2-benzoxazolyl)-7-[bis(2-acetoxyethyl)amino]-2H-1-benzopyran-2-one. When dissolved in acetone, the product exhibits a bright greenish-yellow fluorescence in sunlight and UV light. An absorption maximum (λ max) is observed at 421 nm in the visible absorption spectrum in acetone. Mass spectroscopy spectrum analysis supports the following structure:

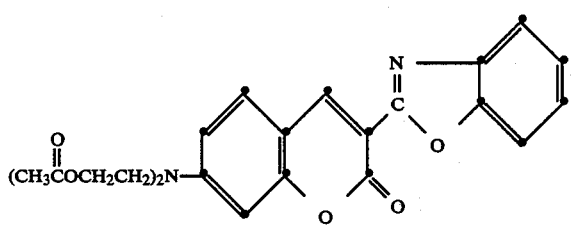

EXAMPLE 2

A mixture of 2-acetoxy-4[bis(2-acetoxyethyl)amino]-benzaldehyde (3.51 g, 0.01 mol), ethyl α-(p-chlorophenylsulfonyl) acetate (2.63 g, 0.01 mol), ethanol (15 mL), piperidine (10 drops), and acetic acid (5 drops) is heated at reflux for 3 hours and the product (3.50 g, 68.9% of theory) is isolated according to the procedure described in Example 5. Mass spectroscopy confirms the yellow product is 7-[bis(2-acetoxyethyl)amino]-3-[(4-chlorophenyl)sulfonyl]-2H-1-benzopyran-2-one having the structure:

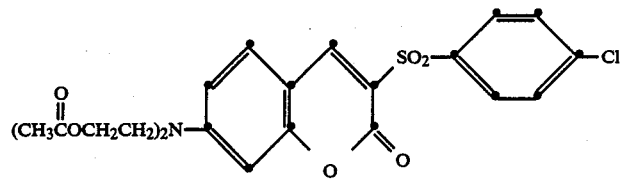

When dissolved in acetone the product exhibits blue-white fluorescence when viewed under UV light and has an absorption maximum at 409 nm.

EXAMPLE 3

A mixture of 2-acetoxy-4[bis(2-acetoxyethyl)amino]-benzaldehyde (1.75 g, 0.005 mol), ethyl α-(2-benzoxazolyl) acetate (1.02 g, 0.005 mol), n-propanol (10 mL), and potassium hydroxide (0.2 g) is heated at 95° to 100° C. for 3 hours and allowed to cool. Methanol (25 mL) is added to precipitate the yellow product which is isolated by filtration, washed with methanol and dried in air (yield 0.25 g). The product has an intense greenish-yellow fluorescence when dissolved in acetone and an absorption maximum (λ max) at 430 nm in the visible absorption spectrum. Mass spectroscopy analysis indicates that the product consists primarily of 3-(2-benzoxazolyl)-7-[bis(2-hydroxyethyl)amino]-2H-1-benzopyran-2-one having the structure:

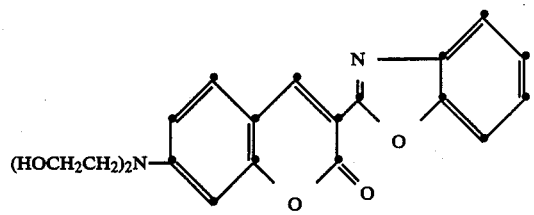

with a minor amount of the mono-acetoxy derivative.

EXAMPLE 4

A mixture of 4-[(2-acetoxyethyl)phenylamino]-salicylaldehyde (2.99 g, 0.01 mol), ethyl α-(2-benzoxazolyl)acetate (2.05 g, 0.01 mol), ethanol (15 mL), piperidine (10 drops), and acetic acid (5 drops) is heated at reflux for 3 hours and then allowed to cool. The crystallized yellow product is collected by filtration, washed with ethanol, and dried in air. A yield of 2.7 g, 61.4% of theory, is obtained. The solid product has a bright yellow fluorescence when observed under UV light and has an absorption maximum (λ max) at 422 nm in the visible absorption spectrum in acetone. Mass spectroscopy analysis confirms the product is 7-[(2-acetoxyethyl)phenylamino]-3-(2-benzoxazolyl)-2H-1-benzopyran-2-one having the structure:

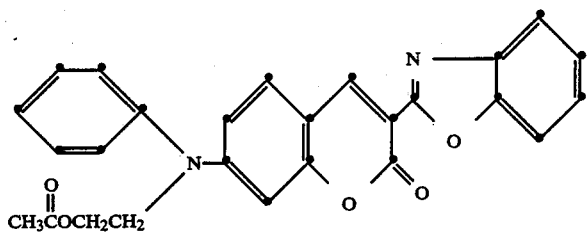

EXAMPLE 5

A mixture of 4-[(2-acetoxyethyl)phenylamino]-salicylaldehyde (1.50 g, 0.005 mol), ethyl cyanoacetate (0.57 g, 0.005 mol), ethanol (10 mL), piperidine (8 drops), and acetic acid (4 drops) is heated at reflux for 2 hours and allowed to cool. The yellow product which crystallizes is collected by filtration, washed with ethanol and dried in air. A yield of 0.55 g, 31.6% of theory is obtained. The solid product has a yellow fluorescence and when dissolved in acetone has an absorption maximum ($\lambda$ max) at 410 nm in the visible absorption spectrum. Mass spectroscopy analysis indicates the product is 7-[(2-acetoxyethyl)phenylamino]-2-oxo-2H-1-benzopyran-3-carbonitrile having the structures:

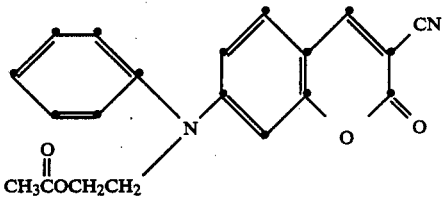

Table I describes additional benzopyran compounds which may be used in the preparation of the novel polyester compositions provided by our invention. These compounds may be prepared according to the procedures described in the preceeding examples or techniques analogous thereto.

TABLE I

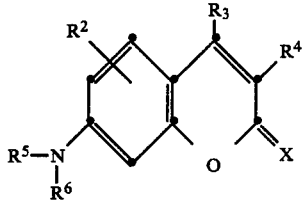

| Example | $R^5$, $R^6$ | $R^2$ | $R^3$ | $R^4$ | X |
|---|---|---|---|---|---|
| 6 | Bis-CH$_2$CH$_2$OOCCH$_3$ | H | H | —CN | O |
| 7 | Bis-CH$_2$CH$_2$OOCCH$_3$ | H | H | —SO$_2$CH$_3$ | O |
| 8 | Bis-CH$_2$CH$_2$OOCCH$_3$ | H | H | —SO$_2$C$_6$H$_5$ | O |
| 9 | Bis-CH$_2$CH$_2$OOCCH$_3$ | H | H | —SO$_2$C$_6$H$_4$—4-CH$_3$ | O |
| 10 | Bis-CH$_2$CH$_2$OOCCH$_3$ | H | H | —SO$_2$C$_6$H$_4$—4-NHCOCH$_3$ | O |
| 11 | Bis-CH$_2$CH$_2$OOCCH$_3$ | H | H | —SO$_2$C$_6$H$_5$ | NH |
| 12 | Bis-CH$_2$CH$_2$OOCCH$_3$ | H | H | —C=N—o-C$_6$H$_4$—O— (bridge to X) | NH |
| 13 | Bis-CH$_2$CH$_2$OOCH | H | H | —SO$_2$(CH$_2$)$_3$CH$_3$ | O |
| 14 | Bis-CH$_2$CH$_2$OOCOC$_2$H$_5$ | H | H | —COC$_6$H$_5$ | O |
| 15 | Bis-CH$_2$CH$_2$OOCC$_6$H$_5$ | H | H | —C$_6$H$_4$—4-CN | O |
| 16 | Bis-CH$_2$CH$_2$OOCC$_6$H$_{11}$ | H | H | —C$_6$H$_4$—4-Cl | NH |

TABLE II

| Example | R⁵, R⁶ | R² | R³ | R⁴ | X |
|---|---|---|---|---|---|
| 17 | Bis-CH₂C₆H₄—4-COOCH₃ | H | H | —CN | O |
| 18 | Bis-CH₂C₆H₄—4-COOCH₃ | | | [—C=N—o-C₆H₃—5-Cl]—O | O |
| 19 | H,H | H | H | —COOC₂H₅ | O |
| 20 | H, —CH(CH₃)C₂H₅ | H | H | —COOCH₂CH₂OH | O |
| 21 | H, —C₆H₅ | H | H | —COOC₆H₄—4-COOCH₃ | O |
| 22 | Bis-C₆H₅ | H | H | —CONHCH₂CH₂OH | O |
| 23 | Bis-C₆H₄—4-CH₃ | H | H | —COOCH₂CH₂OC₂H₅ | O |
| 24 | Bis-C₆H₄—4-OCH₃ | H | H | —COOCH₂CH₂OC₆H₅ | O |
| 25 | Bis-C₂H₅ | H | | [—C=CHCH=C(COOCH₃)]—S | O |
| 26 | Bis-C₂H₅ | H | | [—C=CHCH=C(COOCH₃)]—O | O |
| 27 | Bis-C₂H₅ | H | | [—C=N—o-C₆H₃—6-COOC₂H₃]—S | O |
| 28 | —C₂H₅, —CH₂CH₂COOH | H | H | —COOC₂H₅ | O |
| 29 | —(CH₂)₃CH₃, —CH₂CH₂COOC₂H₅ | H | H | —COOCH₃ | O |
| 30 | Bis-CH₂CH₂COOH | H | H | —CN | O |
| 31 | Bis-CH₂CH₂COOC₂H₅ | H | H | —CN | O |
| 32 | —C₂H₅, —CH₂C₆H₄—4-COOC₂H₅ | H | H | —COOCH₃ | O |
| 33 | Bis-(CH₂)₃CH₃ | H | | [—C=N—o-C₆H₃—6-COOCH₃]—NH | O |
| 34 | —C₂H₅, —CH₂CH₂NCOCH₂CH₂CO | H | | —COOCH₃ | O |
| 35 | Bis-CH₂C₆H₅ | H | H | —COOCH₂CH₂Cl | O |
| 36 | Bis-CH₂CH₂NCO—o-C₆H₄CO | H | H | —COOH | O |
| 37 | —C₆H₁₁, —C₂H₅ | H | H | —COOCH₂C₆H₅ | O |
| 38 | —C₆H₁₀-4-CH₃, —CH₃ | H | | —COOCH₂C=CHCH=CHO | O |
| 39 | Bis-CH₂C₆H₁₁ | H | H | —COOCH₂C₆H₁₁ | O |
| 40 | Bis-CH₂CH₂OH | H | H | —SO₂C₆H₅ | O |

TABLE II-continued

| Example | R⁵, R⁶ | R² | R³ | R⁴ | X |
|---|---|---|---|---|---|
| 41 | Bis-CH₂CH₂OH | H | H | —C=N—o-C₆H₄CONH— | O |
| 42 | Bis-(CH₂)₃OH | H | H | —COC₆H₅ | O |
| 43 | —CH₂CH(OH)CH₂OH, —C₂H₅ | H | H | —SO₂CH₃ | O |
| 44 | —CH₂CH(OOCCH₃)CH₂OOCCH₃, —C₂H₅ | H | H | —C=NN=C—(C₆H₅)—O— | O |
| 45 | —CH₂CH₂SO₂CH₂CH₂— | H | H | —COOCH₃ | O |
| 46 | —CH₂CH₂SO₂CH₂CH₂— | H | H | —COC₆H₄—4-COOH | O |
| 47 | —CH₂CH₂SCH₂CH₂— | H | H | —COC₆H₄—4-COOCH₃ | O |
| 48 | —CH₂CH₂OCH₂CH₂— | H | H | —COOH | O |
| 49 | —CH₂CH₂N(SO₂CH₃)CH₂CH₂— | H | H | —CONHCH₂CH₂OH | O |
| 50 | —CH₂CH₂N(COCH₃)CH₂CH₂— | H | H | —COC₆H₄—4-COOCH₃ | O |
| 51 | —CH₂CH₂N(SO₂C₆H₅)CH₂CH₂— | H | H | —COC₆H₄—4-COOH | O |
| 52 | —CH₂CH₂N(C₆H₅)CH₂CH₂— | H | H | —COOC₂H₅ | O |
| 53 | Bis-CH₂CH₂OC₂H₅ | H | H | —COOH | O |
| 54 | —C₆H₅, —CH₂CH₂OOCCH₃ | H | H | —COC₆H₅ | O |
| 55 | —C₆H₅, —CH₂CH₂OOCCH₃ | H | H | —SO₂C₂H₅ | O |
| 56 | —C₆H₄—4-CH₃, —CH₂CH₂OOCCH₃ | H | H | —CN | O |
| 57 | —C₆H₄—4-OCH₃, —CH₂CH₂OOCC₂H₅ | H | H | —SO₂C₆H₄—3-Cl | O |
| 58 | Bis-CH₂CH₂OOCCH₃ | H | —CH₃ | —CN | O |
| 59 | Bis-CH₂CH₂OOCCH₃ | H | —C₆H₅ | —SO₂C₂H₅ | O |
| 60 | Bis-C₂H₅ | H | —CH₂COOCH₃ | —COOC₂H₅ | O |
| 61 | Bis-C₂H₅ | H | —C₆H₄—4-CH₃ | —COOC₂H₅ | O |
| 62 | Bis-C₂H₅ | H | —C₆H₄—4-COOH | —COOC₂H₅ | O |
| 63 | Bis-CH₂CH₂OOCCH₃ | 6-CH₃ | —CH₂COOH | —COOC₂H₅ | O |
| 64 | Bis-CH₂CH₂OOCCH₃ | 6-Cl | —C₆H₅ | —COOC₂H₅ | O |
| 65 | Bis-CH₂CH₂OOCCH₃ | 6-OCH₃ | —C₆H₅ | —COOC₂H₅ | O |
| 66 | Bis-CH₂CH₂OH | 8-CH₃ | —C₆H₄—4-Cl | —COOC₂H₅ | O |
| 67 | —CH₃, —CH₂CH₂OH | 5-Cl | —C₆H₄—4-Br | —COOC₂H₅ | O |
| 68 | Bis-CH₂CH₂OH | H | —C₆H₄—4-CN | —COC₆H₄—p-COOCH₃ | O |
| 69 | Bis-CH₂CH₂NCOCH₂SCO— | H | H | —COOC₂H₅ | O |
| 70 | Bis-CH₂CH₂NCOCH₂OCH₂CO— | H | H | —COOC₂H₅ | O |
| 71 | Bis-CH₂CH₂NCOCH₂N(CH₃)CO— | H | H | —COOH | O |
| 72 | Bis-(CH₂CH₂O)₂C₂H₅ | H | H | —C=N—o-C₆H₃—5-COOH—O— | O |

TABLE II-continued

| Example | $R^5, R^6$ | $R^2$ | $R^3$ | $R^4$ | X |
|---|---|---|---|---|---|
| 73 | Bis-CH$_2$COOC$_2$H$_5$ | H | H | —C=NN=C(CH$_3$)O (cyclic) | O |
| 74 | H, —CH$_2$CH(CH$_3$)COOCH$_3$ | H | H | —C—NN=C(SC$_2$H$_5$)S | O |
| 75 | —CH$_2$CH$_2$SO$_2$C$_6$H$_5$, —CH$_2$CH$_2$SC$_6$H$_5$ | H | H | —C=CHCH=C(COOC$_2$H$_5$)S (cyclic) | O |
| 76 | Bis-CH$_2$CH$_2$SCH$_2$CH$_2$OH | H | H | —C=N—o-C$_6$H$_4$—S (cyclic) | O |
| 77 | Bis-CH$_2$CH$_2$SC=NN(CH$_2$CH$_2$OH)CH=N | H | H | —CN | O |
| 78 | Bis-CH$_2$CH$_2$O—C$_6$H$_4$—4-COOH | H | H | —C=N—o-C$_6$H$_3$—5-CH$_3$—O (cyclic) | O |
| 79 | Bis-CH$_2$CH$_2$O—C$_6$H$_4$—4-I | H | H | —C=CHCH=C(COOC$_2$H$_5$)O (cyclic) | O |
| 80 | Bis-CH$_2$CH$_2$O—C$_6$H$_4$—4-COOCH$_3$ | H | H | —CONH$_2$ | NH |
| 81 | Bis-(CH$_2$CH$_2$O)$_2$H | H | H | —C=CHN=CHCH=CH (cyclic) | NH |
| 82 | Bis-CH$_2$—C$_6$H$_4$—4-COCl | H | H | —C=CH—o-C$_6$H$_4$—N=CH (cyclic) | O |
| 83 | Bis-CH$_2$C$_6$H$_4$—4-CONHCH$_2$CH$_2$OH | H | H | —C=CHCH=CHS (cyclic) | NH |
| 84 | Bis-CH$_2$CH$_2$OH | H | H | —C=CHCH=C[CON(C$_4$H$_9$)$_2$]S (cyclic) | O |
| 85 | Bis-C$_2$H$_5$ | H | H | —C=CHCH=C[CON(CH$_2$CH$_2$OH)$_2$]S (cyclic) | O |
| 86 | Bis-C$_2$H$_5$ | H | H | —C=CHCH=C[SO$_2$N(CH$_2$CH$_2$OH)$_2$]S (cyclic) | O |

TABLE II-continued

| Example | $R^5, R^6$ | $R^2$ | $R^3$ | $R^4$ | X |
|---|---|---|---|---|---|
| 87 | Bis-CH$_2$CH$_2$OH | H | H | $-$C$=$N$-$o-C$_6$H$_3$$-$6-OCH$_3$$-$CONH | O |
| 88 | $-$CH$_2$CH$_2$OH, $-$C$_6$H$_5$ | H | H | $-$C$=$N$-$o-C$_6$H$_2$$-$4,6-di-Br$-$CONH | O |
| 89 | Bis-C$_2$H$_5$ | H | H | $-$C$=$N$-$o-C$_6$H$_3$$-$5-COOC$_2$H$_5$$-$NCH$_3$ | NH |
| 90 | Bis-CH$_2$CH$_2$CONHCH$_2$CH$_2$OH | H | H | $-$SO$_2$C$_6$H$_3$$-$3,4-di-Cl | O |
| 91 | Bis-C$_2$H$_5$ | H | H | $-$C$=$N$-$o-C$_6$H$_3$$-$5-SO$_2$N(CH$_2$CH$_2$OH)$_2$$-$O | O |

The compounds set forth below are examples of the 7-aminobenzopyran compounds wherein

in combination with the benzopyran nucleus, forms one or two fused, six-membered rings:

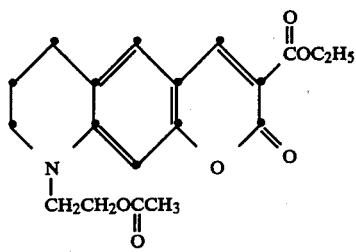

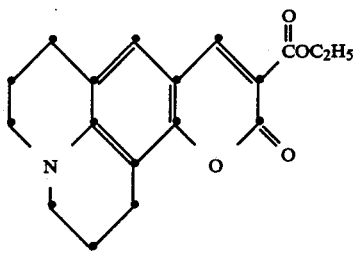

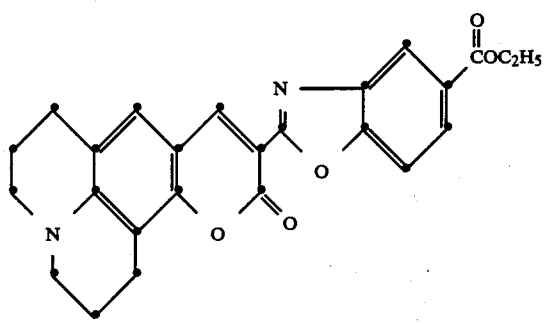

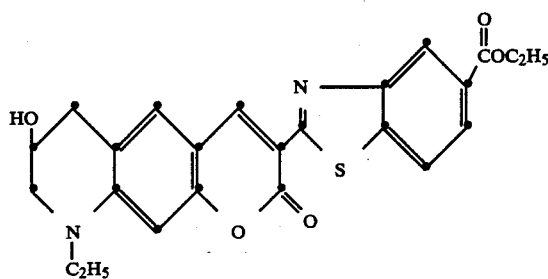

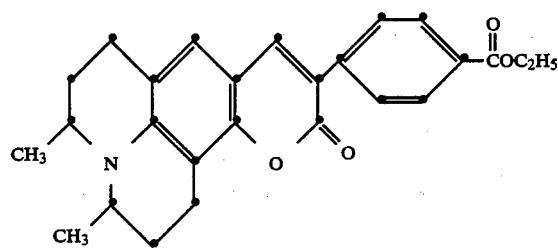

-continued

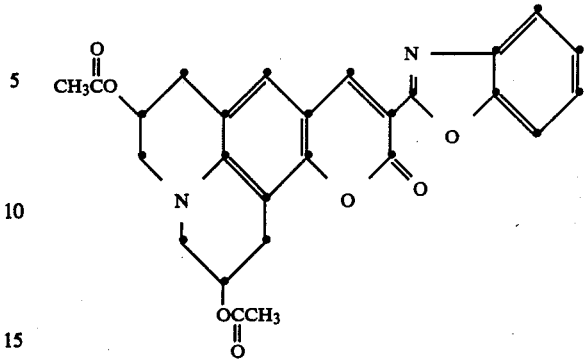

EXAMPLE 92

The following materials are placed in a 500-mL, three-necked, round-bottom flask:

97 g (0.5 mol) dimethyl terephthalate
62 g (1.0 mol) ethylene glycol
0.0087 g Ti from a n-butanol solution of acetyl-triisopropyl titanate
0.0192 g 3-(2-benzoxazolyl)-7-[bis(2-acetoxyethyl)amino]-2H-1-benzopyran-2-one from Example 1.

The flask is equipped with a nitrogen inlet, stirrer, vacuum outlet, and condensing flask. The flask and contents are heated at 200° C. in a metal bath for 60 minutes, at 210° C. for 75 minutes and at 230° C. for 50 minutes with a nitrogen sweep over the reaction mixture while the ester interchange takes place. The temperature of the bath is increased to 270° C. At 270° C., vacuum, with a slow stream of nitrogen bleeding in the system, is applied slowly over a 10-minute period until the pressure is reduced to 100 mm Hg. The flask and contents are heated at 270° C. under a pressure of 100 mm Hg for 30 minutes. The metal bath temperature is increased to 285° C. and the pressure is reduced slowly to 4 to 5 mm Hg. The flask and contents are heated at 285° C. under pressure of 4 to 5 mm Hg for 25 minutes. Then the pressure is reduced to 0.3 to 0.5 mm Hg and polycondensation is continued at 285° C. for 16 minutes. The flask is removed from the metal bath and is allowed to cool in a nitrogen atmosphere while the polymer cyrstallizes. The resulting polymer is yellow colored and has an inherent viscosity of 0.71 measured in a 60/40 ratio by weight of phenol/tetrachloroethane at a concentration of 0.5 g per 100 mL. An ultra-violet visible spectrum of an amorphous film of the polymer shows a strong peak at 415 nm.

The inherent viscosities (I.V. of the copolyesters described herein are determined according to ASTM D2857-70 procedure in a Wagner Viscometer of Lab Glass Inc., of Vineland, New Jersey, having a ½ mL capillary bulb, using a polymer concentration of 0.5%, by weight, in 60/40, by weight, phenol/tetrachloroethane solvent. The procedure comprises heating the polymer/solvent system at 120° C. for 15 minutes to enhance dissolution of the polymer, cooling the solution to 25° C. and measuring the time of flow at 25° C. The I.V. is calculated from the equation:

$$\{\eta\}^{25° C.}_{0.50\%} = \frac{\ln \frac{t_s}{t_o}}{C}$$

where:
{n}=Inherent viscosity at 25° C. at a polymer concentration of 0.5 g/100 mL of solvent;
ln=Natural logarithm;
$t_s$=Sample flow time;
$t_o$=Solvent-blank flow time; and
C=Concentration of polymer in grams per 100 mL of solvent=0.50

The nonextractabilities of the benzopyran residues described herein are determined as follows:

All extractions are done in glass containers with distilled solvents under the time and temperature conditions described below. The sample form is ½ inch×2½ inch segments cut from the cylindrical side wall portion of 2-liter bottles. All samples are washed with cold solvent to remove surface contaminants and are exposed using 200 mL solvent 100 in.² surface area (2 mL/in.²).

Solvent blanks are run under the same extraction conditions without polymer. In most cases samples were extracted, spiked, with a known amount of additive as a control, and analyzed in duplicates. The solvents employed and the extraction conditions for each solvent are:

1. Water. The samples at room temperature are added to solvent and heated at 250° F. for 2 hours. Half of the samples are then analyzed and the remainder are placed in a 120° F. oven for 30 days.

2. 50% Ethanol/Water. The samples at room temperature are added to the solvent at room temperature, placed in an oven at 120° F. and analyzed after 24 hours. Another set of samples is aged for 30 days at 120° F. and then analyzed.

3. Heptane. The samples at room temperature are added to solvent at room temperature and heated at 150° F. for 2 hours. Part of the samples are cooled to room temperature and analyzed spectrophotometrically and the remainder are allowed to age at 120° F. for 30 days before analysis.

Any suitable analytical technique and apparatus may be employed to determine the amount of benzopyran residue extracted from the polymer.

The invention has been described in detail with particular reference to preferred embodiments thereof, but it will be understood that variations and modifications can be effected within the spirit and scope of the invention.

We claim:

1. A composition comprising molding or fiber grade polyester having copolymerized therein or reacted therewith the residue of a benzopyran compound having the formula

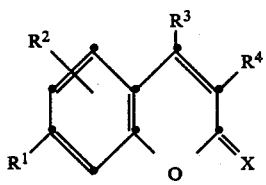

wherein
$R^1$ is amino or

$R^2$ is hydrogen, alkyl, —O—$R^5$, or halogen;
$R^3$ is hydrogen, an alkyl or aryl radical, or

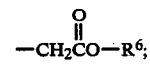

$R^4$ is cyano,

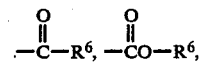

carbamoyl,

—SO$_2$—$R^6$, or a carbocyclic or heterocyclic aryl radical; and
X is oxo or imino; wherein
$R^5$ is alkenyl or an alkyl, cycloalkyl or aryl radical;
$R^6$ is hydrogen or an alkyl, cycloalkyl or aryl radical; and

collectively are (1) a group having the structure

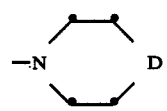

wherein D is —CH$_2$—, —O—, —S—, —SO$_2$—, —N(R$^5$)—,

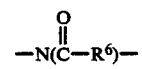

or N(SO$_2$—R$^6$)—; (2) a divalent group having the structure

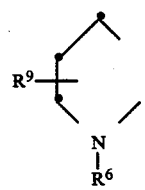

which with the carbon atoms of the benzopyran nucleus forms a fused, six-membered ring; or (3) a trivalent group having the structure

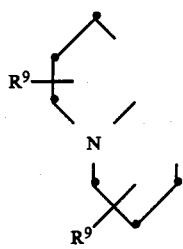

which with the carbon atoms of the benzopyran nucleus forms two fused, six-membered rings; wherein $R^9$ is hydrogen, an alkyl radical, hydroxy, $—OR^5$,

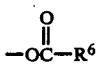

or halogen; provided the benzopyran compound bears at least one substituent that is reactive with one of the monomers from which the polyester is derived, said residues absorbing radiation in the range of about 400 to 450 nm and being non-extractable from said polyester and stable under the polyester processing conditions.

2. A composition according to claim 1 wherein the amount of benzopyran residue present is from 10 to 100,000 ppm.

3. A composition according to claim 1 wherein the amount of benzopyran residue present is from about 50 to 1500 ppm.

4. A composition according to claim 1 comprising molding or fiber grade linear polyester having copolymerized therein or reacted therewith about 200 to 800 parts by weight per million parts by weight polyester of the residue of a benzopyran compound having the formula

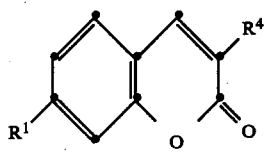

wherein
$R^1$ is N,N-bis(hydroxyalkyl)amino, N-alkyl-N-alkanoyloxyalkylamino, N-aryl-N-hydroxyalkylamino, N-alkyl-N-hydroxyalkylamino, N-aryl-N-alkanoyloxyalkylamino, or N,N-bis(alkanoyloxyalkyl)amino; and N,N-bis(alkanoyloxyalkyl)amino, N-alkyl-N-carboxyalkylamino, N,N-bis(carboxylalkyl)amino, N-alkyl-N-alkoxycarbonylalkylamino, N,N-bis(alkoxycarbonylalkyl)amino, N-alkyl-N-alkoxycarbonylbenzylamino, N,N-bis(alkoxycarbonylbenzyl)amino, N-alkyl-N-carboxybenzylamino or N,N-bis(carboxybenzyl)amino; and
$R^4$ is alkoxycarbonyl, arylsulfonyl, cyano, 2-benzoxazolyl, carboxy-2-benzoxazolyl, alkoxycarbonyl-2-benzoxazolyl, 2-benzothiazolyl, carboxy-2-benzothiazolyl, alkoxycarbonyl-2-benzothiazolyl, 2-benzimidazolyl, carboxy-2-benzimidazolyl or alkoxycarbonyl-2-benzimidazolyl;
wherein each alkyl group and alkyl moiety contains up to 6 carbon atoms and each aryl group is phenyl or phenyl substituted with alkyl of up to 4 carbon atoms or halogen.

5. A composition according to claim 4 wherein the benzopyran compound has the structure

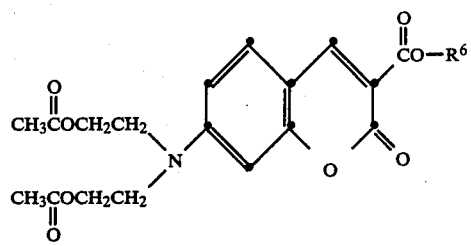

wherein $R^6$ is alkyl of up to six carbon atoms.

6. A composition according to claim 4 wherein the benzopyran compound has the structure

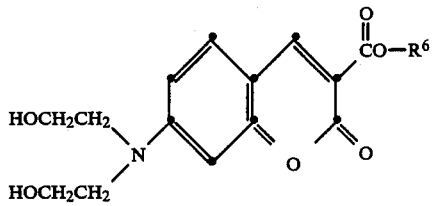

wherein each $R^6$ is alkyl of up to six carbon atoms.

7. A composition according to claim 4 wherein the benzopyran compound has the structure

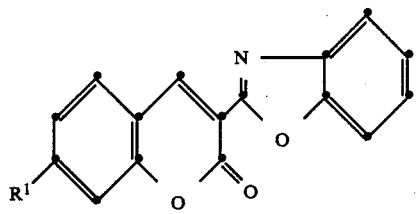

wherein $R^1$ is N,N-bis(2-acetoxyethyl)amino, N,N-bis(2-hydroxyethyl)amino or N-2-(acetoxyethyl)-N-phenylamino.

8. A composition according to claim 1 wherein the polyester is comprised of at least 50 mol percent terephthalic acid residue and the glycol residue is comprised of at least 50 mol percent ethylene glycol or 1,4-cyclohexanedimethanol and the polyester contains from about 50 to 1500 ppm of the benzopyran residue.

9. A composition according to claim 1 wherein the polyester is comprised of from about 75 to 100 mol percent terephthalic acid residue and from about 75 to 100 mol percent ethylene glycol residues and the polyester contains from about 200 to 800 ppm of the benzopyran residue.

10. A formed article of the composition of claim 1.

11. A composition comprising a linear, thermoplastic polyester having copolymerized therein a total of about 2.0 to 10.0 weight percent of the residue of a difunctional benzopyran compound of the formula set forth in claim 1.

12. A composition comprising molding or fiber grade polyester having copolymerized therein the residue of a benzopyran compound having the formula

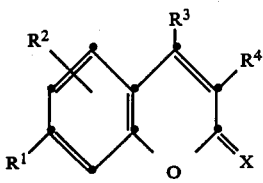

wherein

R¹ is amino or

R² is hydrogen, alkyl, —O—R⁵, or halogen;
R³ is hydrogen, an alkyl or aryl radical, or

R⁴ is cyano,

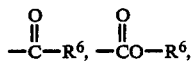

carbamoyl,

—SO₂—R⁶, or a carbocyclic or heterocyclic aryl radical; and
X is oxo or imino; wherein
R⁵ is alkenyl or an alkyl, cycloalkyl or aryl radical;
R⁶ is hydrogen or an alkyl, cycloalkyl or aryl radical; and

collectively are (1) a group having the structure

wherein D is —CH₂—, —O—, —S—, —SO₂—, —N(R⁵)—,

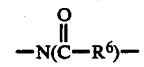

or —N(SO₂—R⁶)—; (2) a divalent group having the structure

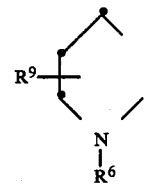

which with the carbon atoms of the benzopyran nucleus forms a fused, six-membered ring; or (3) a trivalent group having the structure

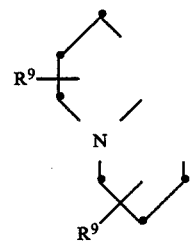

which with the carbon atoms of the benzopyran nucleus forms two fused, six-membered rings; wherein R⁹ is hydrogen, an alkyl radical, hydroxy, —OR⁵,

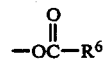

or halogen; provided the benzopyran compound bears two substituents each of which is reactive with one of the monomers from which the polyester is derived, said residues absorbing radiation in the range of about 400 to 450 nm and being non-extractable from said polyester and stable under the polyester processing conditions.

* * * * *